United States Patent [19]

Ohnuki et al.

[11] Patent Number: 4,894,676
[45] Date of Patent: Jan. 16, 1990

[54] AUTOMATIC FOCUSING DEVICE FOR CAMERA

[75] Inventors: Ichiro Ohnuki; Shinichi Matsuyama, both of Tokyo, Japan

[73] Assignee: Canon Kabushiki Kaisha, Tokyo, Japan

[21] Appl. No.: 140,100

[22] Filed: Dec. 31, 1987

[30] Foreign Application Priority Data

Jan. 12, 1987 [JP] Japan ................ 62-004593

[51] Int. Cl.⁴ .............................................. G03B 3/10
[52] U.S. Cl. .................................................. 354/400
[58] Field of Search ...................... 354/400–409; 318/561, 601, 603, 590

[56] References Cited

U.S. PATENT DOCUMENTS

| | | | |
|---|---|---|---|
| 4,451,729 | 5/1984 | Takagi et al. | 354/403 X |
| 4,469,417 | 9/1984 | Masunaga et al. | 354/404 |
| 4,623,238 | 11/1986 | Taniguchi et al. | 354/406 |
| 4,745,425 | 5/1988 | Kusaka | 354/400 |
| 4,777,504 | 10/1988 | Akada et al. | 354/400 |

FOREIGN PATENT DOCUMENTS 45212  3/1986  Japan ................... 354/400

Primary Examiner—W. B. Perkey
Attorney, Agent, or Firm—Fitzpatrick, Cella, Harper & Scinto

[57] ABSTRACT

An automatic focusing device for driving a lens to the in-focus position by a motor, by driving the motor at a high speed when the lens is distanced from the in-focus position by a large amount, or at a low speed when the lens is distance from the in-focus position by a small amount. Even when the lens is distanced from the in-focus position by a large amount, the high-speed drive is not conducted if the motor has to be switched to the low speed in the course of acceleration to the high speed, in order to prevent strong shock to the user, encountered in case of such sudden change to the low speed drive.

11 Claims, 4 Drawing Sheets

AUTOMATIC FOCUSING DEVICE FOR CAMERA

BACKGROUND OF THE INVENTION

1. Field of the Invention

The present invention relates to an automatic focusing device for a camera, for moving a lens to a in-focus position by driving a motor, in response to an output signal of a focus detecting device indicating the defocus amount the in-focus position.

2. Related Background Art

There is already proposed, for example in the Japanese Patent Laid-open No. (94334/1981) corresponding to the German Patent Offenlegung No. 3049233 or the British Pat. No. 2069286, and in the Japanese Patent Laid-open No. (18611/1984) corresponding to the U.S. Pat. No. 4,451,729, an automatic focusing device capable of precisely moving a photographing lens to the in-focus position within a short time, by detecting, while a driving motor is stopped, the required amount of movement for driving the photographing lens to the in-focus position, corresponding to the amount of defocus of said lens, and driving said motor at a high speed for moving the photographing lens to the focused state if said required amount of movement is large, indicating that the lens is positioned far from the in-focus position, or driving said motor at a low speed if said lens has come close to the in-focus position or said lens is originally placed within a predetermined range close to the in-focus position so that said required amount of movement is small. Also the present applicant proposed, in the U.S. patent application Ser. No. 688,355 of Jan. 2, 1985, an automatic focusing motor control method utilizing servo drive. Said servo control method provides a higher driving speed when the amount of defocus is large and a lower driving speed when said amount of defocus becomes smaller.

At first reference is made to FIG. 4 for explaining the process of stopping the photographing lens at the in-focus position, in these known devices.

In FIG. 4, the ordinate indicates the driving speed of the motor while the abscissa indicates said required amount of movement, and a point $P_0$ corresponds to the focused state.

Because of its characteristics, the motor reaches a stable high-speed drive state only after a predetermined amount of movement (corresponding to A in FIG. 4) from the start of drive, and, it cannot be stopped immediately in response to a stop signal but only after a predetermined amount of movement (corresponding to B in FIG. 4).

Therefore, when the lens is at a position $P_1$ corresponding to a large amount of defocus and therefore requiring a large amount of movement, the motor is at first driven at a high speed $N_H$, and is decelerated from a position $P_L$ which is located in front of the in-focus position $P_0$ by a predetermined amount. The motor then continues to be driven at a low speed $N_L$ to a position $P_S$ which is located in front of said in-focus position by a predetermined distance (corresponding to C) which the lens has to travel before stopping when it is braked at the low driving speed $N_L$, and the motor is braked when the lens reaches said position $P_S$ whereby it is stopped at the in-focus position $P_0$.

On the other hand, when the lens is located at a position $P_2$ which is closer than the position $P_L$ to the infocus position $P_0$, corresponding to a small amount of defocus and thus requiring a small amount of movement, the motor is driven at the low speed $N_L$ from the beginning.

However, if the lens is located at a position $P_3$ of a medium amount of movement somewhat farther than the position $P_L$, the motor is accelerated according to the start-up characteristics thereof but the lens reaches the position $P_L$ before the high driving speed $N_H$, and the motor is switched to the deceleration process. There is therefore a very large change in the acceleration, causing a large shock and giving an unpleasant feeling to the user.

SUMMARY OF THE INVENTION

The object of the present invention is to provide an automatic focusing device capable of preventing formation of large shock during the driving operation of a photographing lens, regardless of the defocus amount to the in-focus position.

DESCRIPTION OF THE PREFERRED EMBODIMENTS

Now the present invention will be clarified in detail by embodiments thereof shown in the attached drawings.

Figure 1:
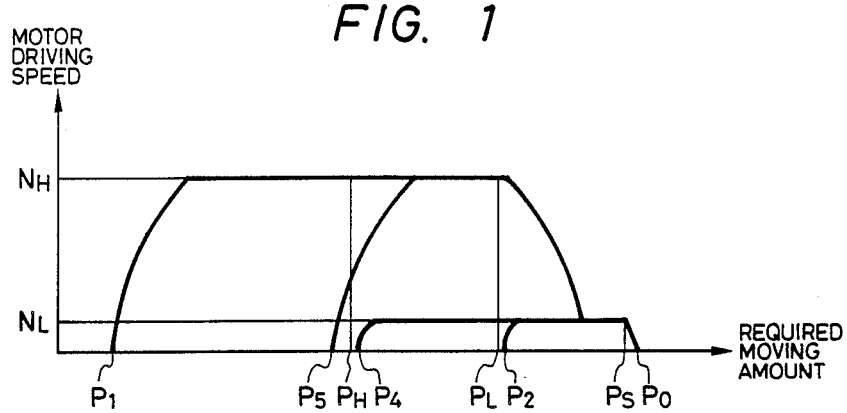
FIG. 1 is a chart showing the driving state of a motor embodying the present invention.
Figure 4:
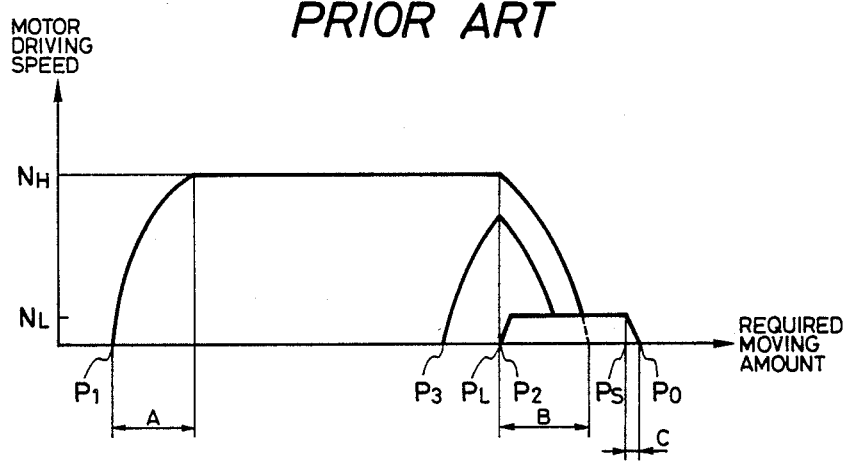
FIG. 4 is a chart showing the driving state of a motor in a conventional automatic focusing device.

FIG. 1 shows the drive state of a motor embodying the present invention, wherein, as in FIG. 4, the ordinate and abscissa respectively indicate the driving speed of the motor and the required amount of movement of a photographing lens, and a point $P_0$ corresponds to the in-focus position.

Also the points $P_1$, $P_2$, $P_S$ and $P_L$ correspond to those in FIG. 4 and will not therefore be explained again.

The driving mode is the same as in the conventional example shown in FIG. 4, when the photographing lens is at $P_1$ requiring a large amount of movement or at $P_2$ requiring a small amount of movement.

In the conventional driving mode, the motor is accelerated to the high driving speed $N_H$ if the required amount of movement is larger than the position $P_L$ even by a small amount. In the present invention, however, there is newly defined a point $P_H$ farther from the point $P_L$, and the motor is driven at the low driving speed $N_L$ from the beginning if the lens is initially located at a position $P_4$ between said points $P_L$ and $P_H$. The high driving speed $N_H$ is employed only if the lens is initially located at a position $P_5$ beyond said point $P_H$.

Consequently, if the lens is initially at the position $P_5$, it is driven at the high driving speed $N_H$ for a certain period, and is then decelerated upon reaching the point $P_L$, so that it is rendered possible to prevent the formation of a strong shock caused by a sudden change from an accelerated state to a decelerated state as in the conventional technology.

However, if said point $P_H$ is selected at a large distance in consideration of the shock preventing effect, the lens at the position $P_4$ will require a long driving time to reach the in-focus position $P_0$, as the distance to be driven with the low driving speed $N_L$ is elongated. Thus the point $P_H$ should be selected at a well-balanced position in consideration of the accelerating and decelerating characteristics of the driving system.

Figure 2:
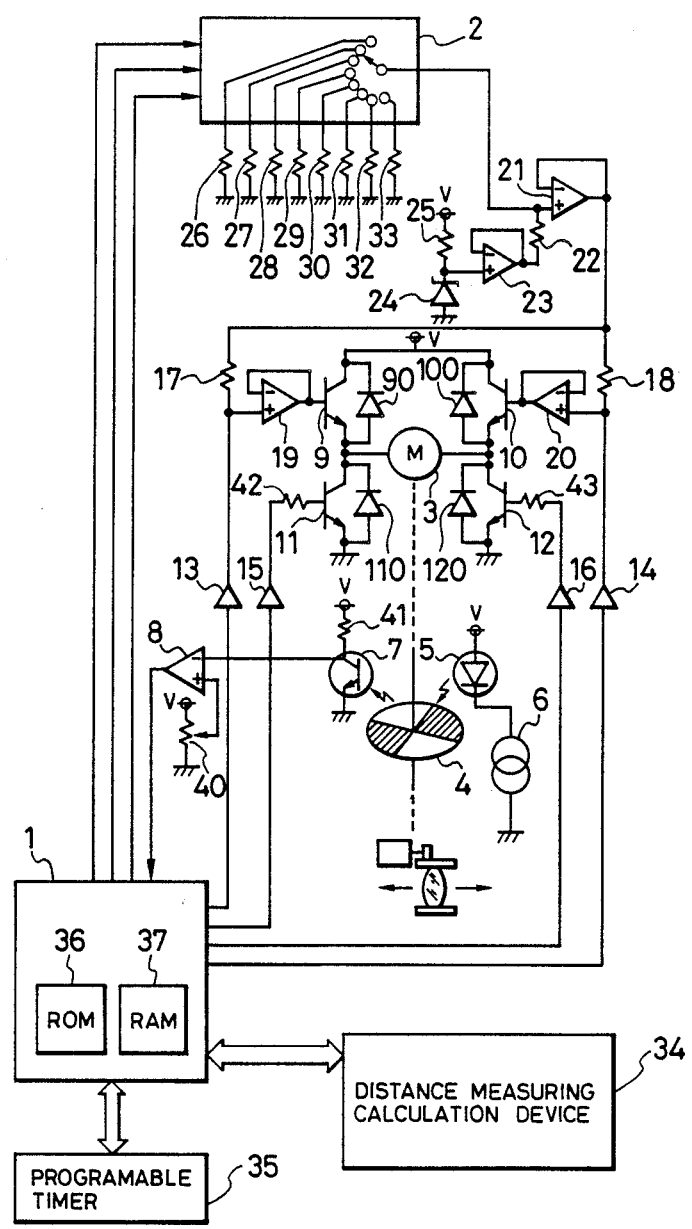
FIG. 2 is a circuit diagram for realizing the driving state shown in FIG. 1.

FIG. 2 illustrates an electrical circuit, employing a microcomputer, for realizing the function shown in FIG. 1.

In FIG. 2 there are shown a microcomputer 1; a multiplexer 2; a motor 3 for driving an unrepresented focusing ring, thereby driving for example a helicoid mechanism for displacing a focusing lens; a pulse plate 4 rotated in linkage with said motor and having pattern defining areas of different light reflectance such as black and white; a light emitting diode (LED) 5; a current source 6 for driving said LED with a constant current; a phototransistor 7 for receiving the light of said LED 5 reflected by the pulse plate 4 and converting the intensity of said light into an electrical signal; a comparator 8 for detecting the amount of rotation of the motor 3 in cooperation with said pulse plate 4, LED 5, current source 6 and phototransistor 7; transistors 9–12 constituting a bridge circuit for driving said motor 3 and respectively connected to blocking diodes 90, 100, 110, 120; buffer gates 13–16; resistors 17, 18, 22; and buffer amplifiers 19–21, 23.

Said transistors 9–12 are on-off controlled by the microcomputer 1 through the buffer gates 13–16. The transistors 9, 10 are on-off controlled by the buffer gates 13, 14 of open-collector output, and the voltage supplied to the motor 3 at the turned-on state (when the buffer gates 13, 14 are open) depends on the output of the buffer amplifier 21. When said buffer gates 13, 14 are open, the output voltage of said buffer amplifiers 21 is supplied to the buffer amplifier 19, 20 through the resistors 17, 18, and the transistors 9, 10 supply the motor 3 with a voltage according to the output voltages of the buffer amplifiers 19, 20. The multiplexer 2, having 8 input terminals respectively grounded through resistors 26–33 and 1 output terminal, connects one of said input terminals with the output terminal in response to a 3-bit control signal supplied from the microcomputer 1.

A Ziner diode 24 is powered through a resistor 25 and supplies the buffer amplifier 23 with a constant voltage. Said buffer amplifier 23 provides a voltage The same as that determined by the Ziner diode 24. The buffer amplifier 21 receives a voltage determined by dividing the constant voltage from the buffer amplifier 23 by means of the resistor 22 and one of the resistors 26–33 selected by the multiplexer 2, and releases the same voltage. For the purpose of controlling the unrepresented focusing ring of the lens, and for moving the focusing lens, the microcomputer 1 receives an instruction from a distance calculation device 34, and, monitoring the amount of drive z of the motor and the driving speed thereof through the pulses given from the comparator 8, controls the rotating direction, the on-off state and the braking of the motor 3 by controlling the transistors 9–12 through the buffer gates 13–16 and by selecting one of the resistors 26–33 of the multiplexer 2 through the 3-bit control signal. There is also provided a programmable timer 35 capable of starting, stopping and resetting time measurement and sending the result of time measurement to the microcomputer 1. In the microcomputer 1 there are incorporated a ROM storing a control program and various constants, and a RAM capable of storing various constants. A positive input terminal of said comparator 8 is connected to a power supply through a variable resistor, and a negative input terminal thereof is connected to said power supply through a resistor 41.

Resistors 42, 43 are connected respectively to the transistors 11, 12.

Figure 3B:
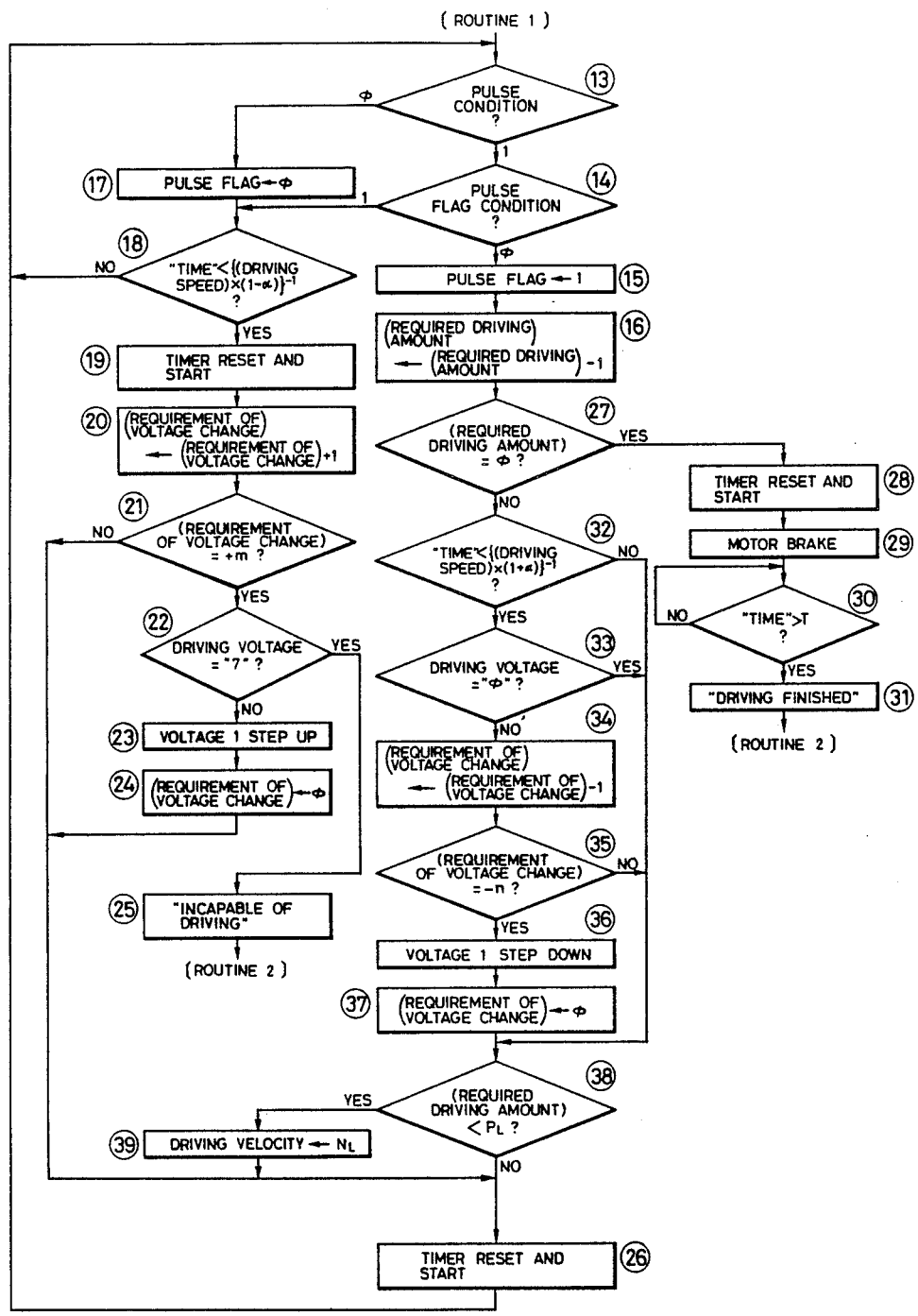
FIGS. 3A and 3B are flow charts showing the function of the circuit shown in FIG. 2.
Figure 3A:
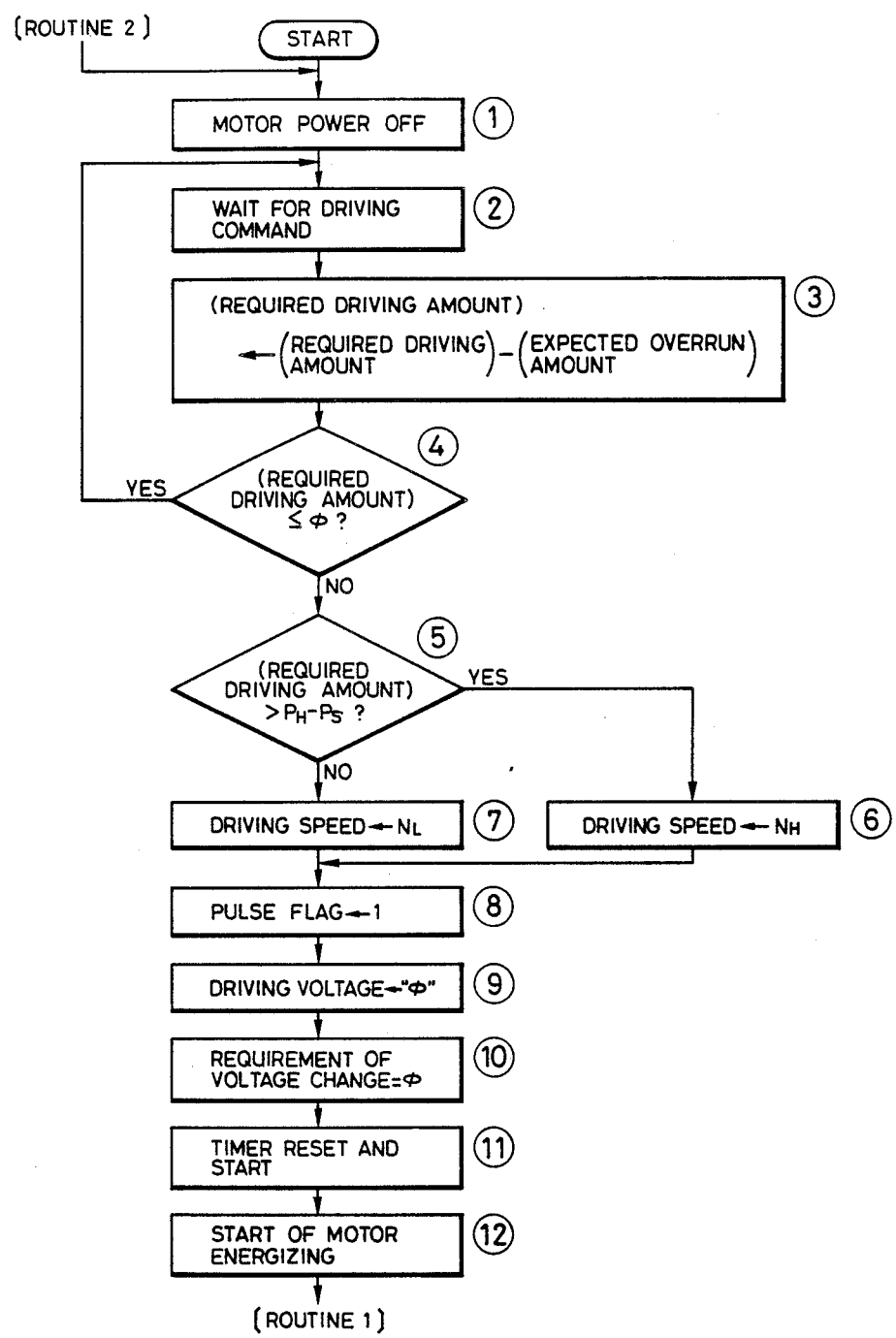

Now reference is made to flow charts shown in FIGS. 3A and 3B, for explaining the function of the above-explained circuit shown in FIG. 2.

In response to the start of the power supply, the microcomputer 1 starts operation from the beginning of the flow shown in FIG. 3A.

[Step 1] At first the buffer gates 13–16 are shifted to the low(L) level state to turn off all the transistors 9–12, thus opening the terminals of the motor 3.

[Step 2] In this state the sequence awaits a drive command from the distance calculation device 34. Said device 34 measures the distance, calculates the defocus amount, converts said defocus amount into a number of pulses of the pulse plate 4 representing the amount of drive of the motor 3, required for driving the focusing ring, and supplies said number as the "required amount of drive", together with the driving direction (either toward a lens position focused to the infinite object distance or a lens position focused to the closest object distance), to the microcomputer 1 for controlling the driving mode of the photographing lens.

[Step 3] When the drive command, driving direction and required drive amount are given, a predetermined amount C (stored in ROM 36) required for braking during the low-speed drive is subtracted from the required drive amount, and the obtained result is regarded as the required drive amount. Therefore, when the braking is applied after a drive of said required drive amount, the lens stops after the "required amount of drive" calculated by the distance calculation device 34 if the motor speed immediately before braking, and the mechanical characteristics of the motor and lens tube are same as those designed.

[Step 4] If "the required drive amount" obtained by subtracting the predetermined amount C is zero or negative, a new drive command is awaited since such drive is not possible.

[Step 5] The required drive amount is compared with $(P_H-P_S)$ in FIG. 1, and the sequence proceeds to a step 6 or 7 respectively when the former is larger or smaller.

[Step 6] A high driving speed $N_H$ is stored in a predetermined address of the RAM 37.

[Step 7] A low driving a speed $N_L$ is stored in a predetermined address of the RAM 37.

In this manner the high driving speed or the low driving speed is set respectively when the original "required drive amount" determined by the distance calculation device 34 is farther or closer than the point $P_H$.

[Step 8] A pulse flag in the RAM 37 is initialized to "1".

[Step 9] The driving voltage is set at the lowest value ("0"). More specifically, one of the resistors 26–33 is selected by the multiplexer 2, and the output voltage of the buffer amplifier 23, determined by the Zener diode 24, is supplied to the buffer amplifier 21 through the resistor 22. The input voltage to the buffer amplifier 21 is lowest ("0") or highest ("7") respectively by selecting a resistor of lowest or highest resistance from the resistors 26–33, and a corresponding voltage is given to the motor 3 through the transistor 10.

[Step 10] A value "0" is set as the initial value of a voltage change request.

[Step 11] The pulse plate 4 rotated in linkage with the motor 3 and the unrepresented focusing ring reflects the light from the LED 5, and the repeated intensity change caused by the black-and-white pattern on said pulse plate corresponding to the rotation angle thereof is converted into an electrical signal in the phototransistor 7 and further into pulses "1" and "0" in the comparator 8. The timer 35 is reset and activated in order to determine the rotated/stopped state or to measure the rotating speed of the motor 3 or the focusing ring, in relation to the interval of said pulses.

[Step 12] The transistors 9, 12 or the transistors 10, 11 are turned on while the other set are turned off thereby supplying the motor 3 with a current corresponding to the instructed direction of rotation.

[Step 13] The state of the pulse is read, and the sequence proceeds to a step 17 or 14, respectively if the pulse is "0" or "1".

[Step 14] The sequence proceeds to a step 18 or 15 respectively if the pulse flag, indicating the state or preceding pulse, is "0" or "1".

[Step 15] The pulse flag is set from "0" to "1", and the sequence proceeds to a step 16.

[Step 17] If the step 13 identifies a pulse state "0", the pulse flag indicating the state of the preceding pulse is set to "0".

In this manner the state of the pulse is identified and is compared with the state of the preceding pulse in order to detect the start of a pulse. The sequence proceeds to the step 16 or 18 respectively if a pulse has been started or not, and the state of the present pulse is stored by the pulse flag.

[Step 18] When a pulse has not been started, it is determined if the time measured by the timer 35 has exceeded a maximum pulse duration. Said maximum pulse duration indicates a pulse duration (pulse interval) at a driving speed lower by a tolerance $\alpha$ than the predetermined driving speed, namely a duration indicated by $\{\text{"predetermined driving speed"} \times (1-\alpha)\}^{-1}$. If the measured time has not reached the maximum pulse duration, the sequence returns to the step 13 to repeat the detection of the pulse state. On the other hand, if the measured time has reached the maximum pulse duration, the sequence proceeds to a step 19.

[Step 19] The time 35 is reset and reactivated.

[Step 20] The voltage change request value stored in the RAM 37 is increased by 1, in order to memorize the number of recognitions of the request for increasing the motor driving voltage.

[Step 21] It is determined if the number of voltage change requests has reached a number m. The sequence proceeds to a step 26 if said number has not reached m. On the other hand, the sequence proceeds to a step 22 if said requests have been made m times, namely the speed corresponding to the previous voltage change is identified, at least m times, lower than "driving speed $\times (1-\alpha)$".

[Step 22] If is determined if the selected driving voltage is at the maximum level "7", and the sequence proceeds to a step 25 or 23 respectively if said maximum level "7" has been selected or not.

[Step 23] A resistor of next higher resistance, than that of the resistor currently selected, is selected by the multiplexer 2 from the resistors 26–33, thereby providing the motor 3 with a one-step higher voltage.

[Step 24] The voltage change request is reset to zero.

[Step 25] If the step 22 identifies the driving voltage at the maximum level "7", there is identified a drive disabled state in which a higher voltage cannot be given to the motor, and the sequence returns from the routine 2 to the start of the program.

[Step 26] The timer 35 is reset and restarted, and the sequence returns to the step 13 for pulse state detection.

[Step 16] If the pulse state detection in the step 13 indentifies the start of pulse, a pulse is counted and the value of the required drive amount is decreased by one.

[Step 27] It is determined if the required drive amount is equal to zero or not, and the sequence proceeds to a step 28 or 32 respectively if it is zero or not.

[Step 28] If the required drive amount is zero, there is identified the completion of the required drive, and the timer 35 is reset and restarted.

[Step 29] The motor 3 is braked by turning off the transistors 9, 10 and turning on the transistors 11, 12 thereby shortcircuiting the terminals of the motor 3 through the transistors 11, 12 and the ground and using the motor 13 itself as a load for the rotation of the focusing ring.

[Step 30] The sequence waits until the time measured by the timer 35 restarted in the step 28 reaches a predetermined time T.

[Step 31] The end of the driving operation is identified when the braking time to the motor 3 reaches the predetermined time T, and is transmitted to the distance calculation device 34, and the sequence returns from the routine 2 to the start of the program.

[Step 32] If the required drive amount detected in the step 27 after the start of a pulse is not yet zero, it is determined whether the time measured by the timer 35 has exceeded the minimum pulse duration. Said minimum pulse duration indicates the pulse interval, at a driving speed higher by a tolerance $\alpha$ by the predetermined driving speed and can be represented as $\{\text{"driving speed"} \times (1+\alpha)\}^{-1}$. The sequence proceeds to a step 38 or 33 respectively if the pulse duration is larger or smaller than said minimum duration.

[Step 33] It is determined if the selected driving voltage is at the minimun level "0", and the sequence proceeds to a step 38 or 34 respectively if it is at the level "0" or not.

[Step 34] The value of the voltage change request is decreased by 1, in order to memorize the number of recognitions that the driving voltage has to be lowered in order to reduce the driving speed.

[Step 35] It is determined if the value of the voltage has reached a predetermined value "$-n$", and the sequence proceeds to a step 36 or 38 respectively when the value $-n$ has been reached or not.

[Step 36] When the value of the voltage change request has reached $-n$, the driving voltage is reduced by one step.

[Step 37] The value of the voltage change request is reset to zero.

[Step 38] It is determined if the required drive amount is smaller than a predetermined value $P_L$, and the sequence proceeds to a step 39 or 26 respectively if the former is smaller or not.

[Step 39] A position close to the in-focus position is identified when the required drive amount is smaller than the predetermined value $P_L$, and the driving speed is switched to the low driving speed $N_L$. Then the sequence proceeds to the step 26.

In the foregoing embodiment, the rotating speed of the motor 3 is controlled by the driving voltage therefor, but the present invention is applicable also to other speed control methods, such as a method of driving the motor with pulses and varying the number of said pulses per unit time, or a method of speed control by a combination of continuously powered drive and duty ratio-controlled drive.

As explained in the foregoing, the drive is started with the high driving speed $N_H$ if the required driving amount is larger than $P_H$, but is started with the low driving method speed $N_L$ if said amount is equal to or lower than $P_H$, and, in the former case, the drive is switched to the low driving speed $N_L$ when the remaining driving amount becomes smaller than $P_L$.

Figure 5:
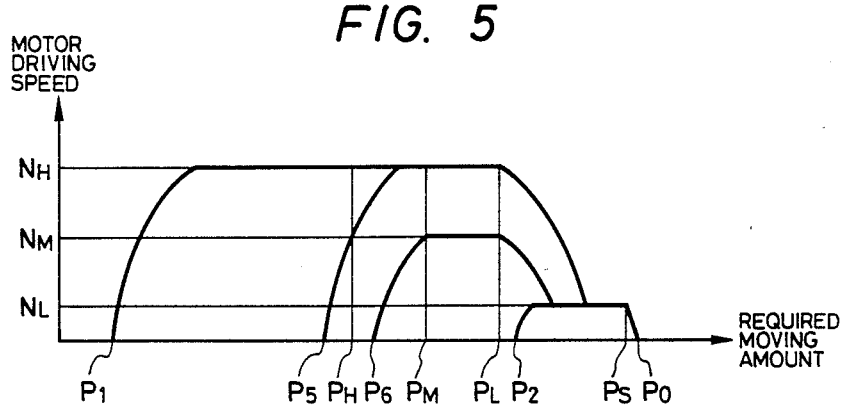
FIG. 5 is a chart showing the driving state of a motor in another embodiment of the present invention.

Now reference is made to FIG. 5 for explaining another embodiment, which is to reduce the time required to reach the in-focus position, from a position close to a point $P_M$ but where the required amount of movement is smaller than for the point $P_M$. The point $P_M$ is defined between the points $P_H$ and $P_L$, and a medium driving speed $N_M$ is defined, and, when the lens is located between the points $P_H$ and $P_M$, said medium driving speed is adopted instead of the low driving speed, thereby reducing the time required to reach the in-focus position, in comparison with the foregoing embodiment.

As explained in the foregoing, in the automatic focusing device of the foregoing embodiments, for an intermediate amount of defocus in which the high speed driving is to be soon switched to the low speed driving, there exists a case in which the high speed driving continues for a certain period so that a strong shock is not generated upon switching to the low speed driving, and a case in which a strong shock is generated since the deceleration starts in the course of acceleration to the high driving speed or immediately after arrival at said high driving speed. In the former case the driving operation is conducted in the same manner as in a large defocus amount, but in the latter case the driving operation is conducted with the low driving speed from the beginning, so that smooth driving operation can be achieved without strong shock to the user, regardless of the amount of defocus, and the increase in the driving time can be minimized even for a medium defocus amount.

We claim:

1. An automatic focusing device for moving a photographing optical system to a in-focus position by a driving motor, comprising:
    (a) first control means for driving said motor at a high speed, when said photographing optical system is distanced in excess of a first amount from said in-focus position, thereby moving said photographing optical system to said in-focus position with a high speed, said first control means being further adapted to change said motor to a low driving speed when said photographing optical system reaches a position distanced from said focused position by a predetermined amount;
    (b) second control means for driving said motor at a low speed, when said photographing optical system is distanced less than a second amount from said in-focus position, thereby moving said photographing optical system to said in-focus position with a low speed; and
    (c) third control means for prohibiting said high-speed driving even when said photographing optical system is distanced in excess of said first amount from said in-focus position, if said motor, upon reaching a predetermined high speed after the start of the high-speed drive, cannot be maintained at said predetermined high speed for a predetermined period.

2. A device according to claim 1, further comprising additional control means for driving said motor at said low speed, when said high-speed driving is prohibited by said third control means.

3. A device according to claim 1, further comprising additional control means for driving said motor at a speed selected between said high speed and said low speed, when said high-speed driving is prohibited by said third control means.

4. A device according to claim 1, wherein said first amount in said first control means is selected equal to said second amount in said second control means.

5. An automatic focusing device for rotating a driving motor at a high speed, when a photographing optical system is distanced by a large defocus amount from the in-focus position thereby moving said photographing optical system to the in-focus position at a high speed, and for rotating said driving motor at a low speed when said photographing optical system is distanced by a small defocus amount from the in-focus position thereby moving said photographing optical system to the in-focus position at a low speed, comprising:
    (a) distance measuring and calculation means for detecting the defocus amount of said photographing optical system to the in-focus position; and
    (b) control means for controlling the rotating speed of said motor to at least a first lower speed or a second higher speed in response to said defocus amount detected by said distance measuring and calculation means,
    wherein said control means is adapted so that:
    (b-1) when said motor is driven in said second higher speed toward a direction of the in-focus position, the motor driving speed is changed into said first lower speed when the defocus amount becomes smaller than a first predetermined amount, and
    (b-2) when said defocus amount is smaller than a second predetermined amount, said motor is driven at said first lower speed from the beginning, and when said defocus amount is larger than said second predetermined amount, said motor is driven at said second high speed from the beginning, wherein said second predetermined amount is larger than said first predetermined amount, and the difference between said first and second predetermined amounts is at least equal to the defocus amount of movement required for said motor to reach said second higher speed from a stopped state.

6. A device according to claim 5, wherein said distance measuring and calculation means performs distance measuring, calculates the defocus amount, and determines a direction and amount of motor rotation for obtaining an in-focus state.

7. A device according to claim 5, further comprising means for detecting the change in said defocus amount, and wherein said detecting means is adapted to detect the change in said defocus amount in the course of movement of said photographing optical system by said motor.

8. A device according to claim 7, wherein said detecting means at least comprises a rotary wheel rotated in linkage with the rotation of said motor, and a detecting element for detecting the amount of rotation of said rotary wheel.

9. A device according to claim 5, wherein said first predetermined amount is larger than an amount of movement required by said motor to be decelerated from said second speed to said first speed.

10. A device according to claim 5, wherein the driving speed of said motor is controlled by a change in driving voltage.

11. A device according to claim 9, wherein the driving speed of said motor is controlled by a change in driving voltage.

* * * * *

UNITED STATES PATENT AND TRADEMARK OFFICE
CERTIFICATE OF CORRECTION

PATENT NO. : 4,894,676                               Page  1  of  2

DATED    : January 16, 1990

INVENTOR(S) :  Ohnuki, et al.

It is certified that error appears in the above-identified patent and that said Letters Patent is hereby corrected as shown below:

[57]    ABSTRACT:

Line 5, "distance" should read --distanced--.

FIG. 2 (Sheet 2):

Element 35, "PROGRAMABLE TIMER" should read
          --PROGRAMMABLE TIMER--.

COLUMN 1:

Line 5, "a" (third occurrence) should read --an--.

COLUMN 3:

Line 35, "amplifiers 21" should read --amplifier 21--.

Line 36, "amplifier 19, 20" should read
          --amplifiers 19, 20--.

Line 44, "Ziner diode 24" should read --Zener diode 24--.

Line 46, "The" should read --the--.

Line 47, "Ziner diode 24." should read
          --Zener diode 24--.

UNITED STATES PATENT AND TRADEMARK OFFICE
CERTIFICATE OF CORRECTION

PATENT NO. : 4,894,676

DATED : January 16, 1990

INVENTOR(S) : Ohnuki, et al.

It is certified that error appears in the above-identified patent and that said Letters Patent is hereby corrected as shown below:

COLUMN 5:

Line 58, "If" should read --It--.

COLUMN 7:

Line 44, "a" (first occurrence) should read --an--.

Signed and Sealed this

Third Day of December, 1991

Attest:

HARRY F. MANBECK, JR.

*Attesting Officer*    *Commissioner of Patents and Trademarks*